Feb. 23, 1954 — W. S. PRATT — 2,669,752
MOLDING PROCESS
Filed Aug. 2, 1949

INVENTOR
WILLIAM S. PRATT
BY Parham & Bates
ATTORNEYS

Patented Feb. 23, 1954

2,669,752

UNITED STATES PATENT OFFICE 2,669,752

MOLDING PROCESS

William S. Pratt, Pleasant Valley, Conn., assignor to Plax Corporation, West Hartford, Conn., a corporation of Delaware Application August 2, 1949, Serial No. 108,165

1 Claim. (Cl. 18—55)

The present invention relates to the production of bottles and other hollow articles from plastic materials and more particularly to improved process for producing smooth external surfaces on articles made by blowing hollow plastic bubbles or other preforms into shaping contact with mold cavity walls.

It has previously been proposed (see U. S. patent to Kopitke, No. 2,260,750, issued October 23, 1946) to make containers from organic plastic materials by first forming the material into an elongated tubular bubble, blowing the bubble within a blow-mold to form a bottle and then severing the neck of the bottle from the tubular material. Thereafter, the bottle is removed from the mold and any excess material trimmed from the neck to provide a finished lip.

It has been difficult to produce bottles with smooth surfaces by the method indicated and with the molds heretofore used. Those molds have been provided with smoothly ground and polished molding surfaces which might be expected to produce blown articles with correspondingly smooth molded surfaces. However, this has not been found to be the case and articles made in such molds have undesirable irregularities in their surfaces.

An object of the present invention is to avoid such irregularities and produce blown articles with smooth surfaces.

A further object is to provide blow-molding practice wherein articles are blown into engagement with a shaping wall, the surface of which is etched or otherwise roughened so as to provide a plurality of rigid restraining high points spaced from each other by interconnected valleys containing cushioning air.

The manner in which the above and other objects and advantages are obtained are pointed out or will be apparent from the following description which is made with reference to the accompanying drawing which illustrates a preferred embodiment of the invention.

Figure 1:
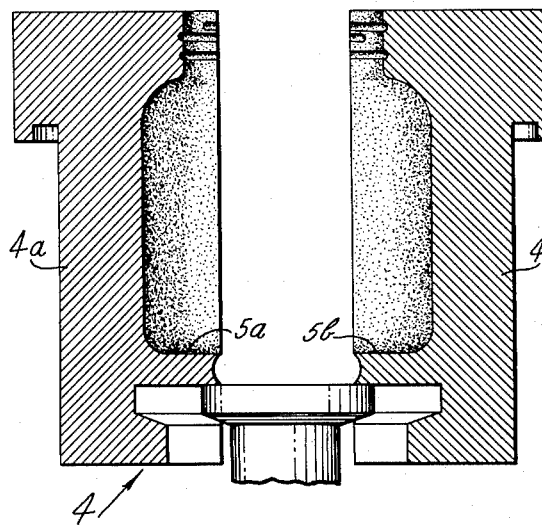
Figure 1 is a vertical section through an open blow mold the molding surface of which is microscopically etched or pitted.
Figure 2:
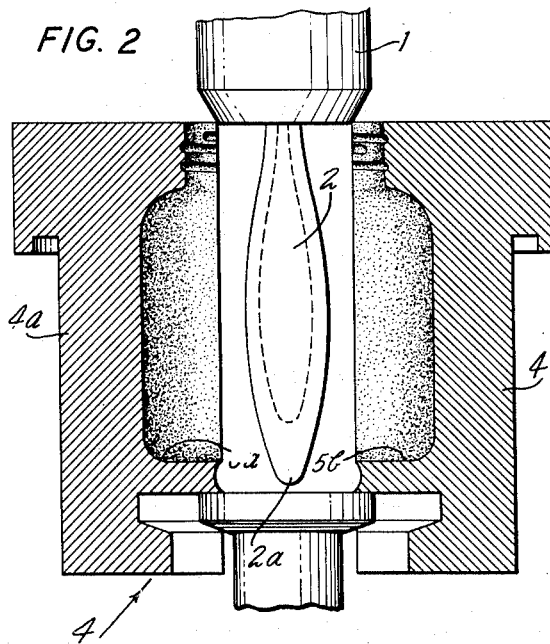
Fig. 2 is a view, similar to Fig. 1, showing a plastic bubble extruded into the open mold.

Referring more particularly to Fig. 2, there is illustrated the outlet or extrusion end 1 of a nozzle from which thermoplastic material is extruded in a tubular form 2; reference may be made to the aforementioned patent to Kopitke and to the latter's U. S. Patent No. 2,349,176 for details of suitable extruders and extruder nozzles of which the outlet end 1 may be a part. The closing of the leading end 2a of the tubular material may be effected by the shearing action of a cut-off knife blade (not shown) following completion of the preceding bottle-forming operation. Thereafter, the tubular material 2 is extruded from the nozzle 1 as an elongated bubble from which a hollow molded article, such as a bottle, may be blown within a two-section mold indicated generally by the numeral 4. The two sections 4a and 4b of the mold 4 meet in a vertical plane and may be moved to the opened and closed positions illustrated in Figs. 1 and 3.

In the embodiment illustrated, the mold sections 4a and 4b respectively contain mold cavities 5a and 5b which are shaped to form a bottle or flask 6 (Fig. 3) including a threaded neck portion 6a and a body portion 6b. It will be understood, of course, that the mold cavities 5a and 5b may be shaped to form the bottom, body and neck portions of any desired type and shape of bottle.

Figure 4:
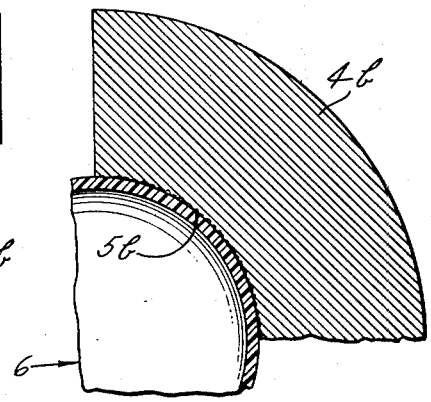
Fig. 4 is an enlarged cross-sectional view taken on line 4—4 of Fig. 3 showing the engagement of a portion of the bottle wall with the etched wall of the mold.

In accordance with the present invention the cavities 5a and 5b are etched so as to have the microscopically roughened molding surfaces shown in Fig. 4. The following table shows the type of mold metal, the acid used and the approximate time required to satisfactorily etch and roughen the previously smooth molding surfaces of the cavities 5a and 5b. All acids are commercial grade.

| Mold Metal | Acid | Time |
|---|---|---|
| Aluminum | Hydrochloric | 15 seconds. |
| Bronze | Nitric | 30–60 seconds. |
| Cast Iron | 80 parts conc. hydrochloric<br>20 parts conc. nitric<br>7.5 parts 85% phosphoric | 1–5 minutes. |

Prior to etching, the molding surfaces preferably are polished, if necessary, so that their surface roughness is of the order of 3 to 6 microinches as measured by a "brush surface gage." After etching, a uniform roughness of the order of 300 micro-inches as measured by the same gage is preferably provided by the etching.

Besides using acid to provide the described roughness, sand blasting with very fine particles, or other alternatives, may be used to provide the uniformly roughened surface.

Figure 3:
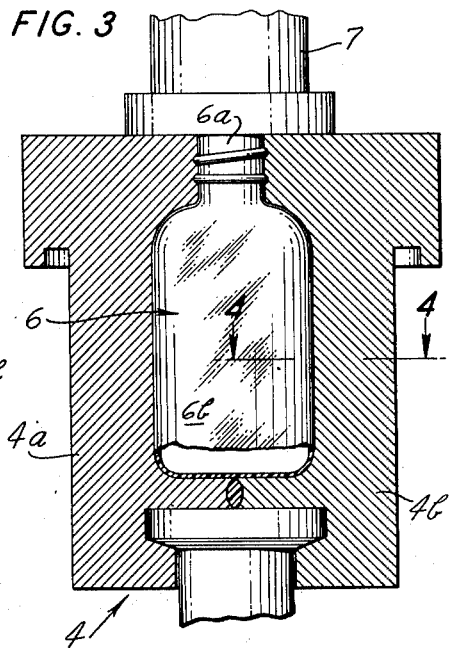
Fig. 3 is a view of the closed mold showing the bubble blown into a bottle within the closed mold by a blowhead.

The operation of the molding mechanism employing molds having the described roughened molding surfaces is as follows:

The hollow tube 2 of plastic material is extruded from the nozzle 1 downwardly between the open mold members to the position illustrated in Fig. 2. Thereafter, the mold members 4a and 4b are closed, the nozzle is raised from the mold 4 and a cut-off or shearing blade severs the connection between the plastic in the mold and the extrusion nozzle. At the same time, the blade shears and closes the leading end of the tubular material 2 within the nozzle preparatory to the next extruded operation. Any failure of the blade to completely close the end of the tube is rectified by the mold members 4a and 4b which act to pinch the leading end 2a and reseal the bottom of the tube as shown in Fig. 3. Following severing of the plastic tube between the nozzle 1 and the mold 4, the tube 2 is blown by air pressure from a blowhead 7 into surface contact with the high points of the roughened mold cavity walls.

In accordance with the present invention, the high points of the roughened molding surfaces determine the size of the molded bottle 6 while the valleys in the etched surfaces provide pockets in which the air between the bottle 6 and the mold 4 is compressed. The valleys in the etched surfaces are uniformly interconnected and of generally uniform depth so that the air pressure built up therein is uniformly distributed and exerted over the outer surface of the bottle. Thus, the bottle wall is expanded by a pressing wall of air within the bottle which works against an opposing wall of air which exerts a reactance pressure uniformly on the exterior of the bottle. The air between the bottle and the mold can not be captured in isolated pockets, as may occur when smoothly polished molding surfaces are employed. Rather, the air entrapped between the bottle and the mold escapes uniformly from all points on the outer surface of the bottle or is compressed uniformly in the multitude of microscopic pockets uniformly located in the molding surfaces.

Bottles formed in the above described manner have uniformly smooth surfaces rather than the blotchy surfaces which may be frequently produced in smoothly polished molds.

Having thus described my invention, I claim:

The process of forming hollow articles of organic plastic material which comprises forming a preform of such material, expanding the preform by internal fluid pressure and pressing the outer surface of the preform into fixed engagement with a multiplicity of spaced high points distributed substantially uniformly over the molding surface of a mold to form the hollow article, capturing air between the preform and the mold in a communicating net-work of passages distributed among the high points in the mold, and exerting uniform pressure with said captured air against said article about the high points of the mold fixedly engaged by the article, whereby uniform fluid pressure is evenly applied against the article while the article maintains the fixed engaging and shaping contact with the spaced points of the molding surface, and thereafter removing the shaped article from the mold.

WILLIAM S. PRATT.

References Cited in the file of this patent

UNITED STATES PATENTS

| Number | Name | Date |
| --- | --- | --- |
| 151,060 | Sheridan | May 19, 1874 |
| 1,556,925 | Frink | Oct. 13, 1925 |
| 2,023,645 | Newton | Dec. 10, 1935 |
| 2,410,936 | Gronemeyer | Nov. 12, 1946 |